(12) United States Patent
Yin et al.

(10) Patent No.: US 11,244,180 B2
(45) Date of Patent: Feb. 8, 2022

(54) DEEP LEARNING MODEL USED FOR DRIVING BEHAVIOR RECOGNITION AND TRAINING APPARATUS AND METHOD THEREOF

(71) Applicant: FUJITSU LIMITED, Kawasaki (JP)

(72) Inventors: Rui Yin, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 16/730,481

(22) Filed: Dec. 30, 2019

(65) Prior Publication Data
US 2020/0242382 A1 Jul. 30, 2020

(30) Foreign Application Priority Data
Jan. 25, 2019 (CN) .......................... 201910073206.X

(51) Int. Cl.
| | |
|---|---|
| G06K 9/00 | (2006.01) |
| G06K 9/62 | (2006.01) |
| G06N 3/04 | (2006.01) |
| G06N 3/08 | (2006.01) |

(52) U.S. Cl.
CPC ..... *G06K 9/00845* (2013.01); *G06K 9/00791* (2013.01); *G06K 9/623* (2013.01); *G06K 9/629* (2013.01); *G06K 9/6256* (2013.01); *G06K 9/6265* (2013.01); *G06N 3/0445* (2013.01); *G06N 3/0454* (2013.01); *G06N 3/08* (2013.01)

(58) Field of Classification Search
CPC ........... G06K 9/00845; G06K 9/00791; G06K 9/623; G06K 9/6256; G06K 9/6265; G06K 9/629; G06N 3/0445; G06N 3/0454; G06N 3/08
See application file for complete search history.

(56) References Cited

U.S. PATENT DOCUMENTS

| | | | |
|---|---|---|---|
| 2018/0032846 A1* | 2/2018 | Yang | G06K 9/4604 |
| 2019/0251358 A1* | 8/2019 | Khosla | G06K 9/3233 |

FOREIGN PATENT DOCUMENTS

| | | |
|---|---|---|
| CN | 106611169 A | 5/2007 |
| CN | 10786231 A | 3/2018 |
| CN | 108216252 A | 6/2018 |
| CN | 108319909 A | 7/2018 |
| CN | 108388544 A | 8/2018 |

OTHER PUBLICATIONS

Chi, L., & Mu, Y. (2017). Deep steering: Learning end-to-end driving model from spatial and temporal visual cues. arXiv preprint arXiv: 1708.03798. (Year: 2017).*

(Continued)

*Primary Examiner* — Fayyaz Alam
(74) *Attorney, Agent, or Firm* — Staas & Halsey, LLP

(57) ABSTRACT

Embodiments of this disclosure provide a deep learning model used for driving behavior recognition and training apparatus and method thereof. In recognition, the model performs feature extraction by using a plurality of consecutive input images captured from a driving angle of view of a vehicle, and performs temporal and spatial fusion on extracted features by using a recursive neural network. In training, as images captured from a driving angle of view of a vehicle are acquired, the model may be trained. Hence, the model may accurately recognize various classes of driving behaviors.

8 Claims, 3 Drawing Sheets

(56) References Cited

OTHER PUBLICATIONS

Olabiyi, O., Martinson, E., Chintalapudi, V., & Guo, R. (2017). Driver action prediction using deep (bidirectional) recurrent neural network. arXiv preprint arXiv: 1706.02257. (Year: 2017).*

S. Virmani and S. Gite, "Performance of convolutional neural network and recurrent neural network for anticipation of driver's conduct," 2017 8th International Conference on Computing, Communication and Networking Technologies (ICCCNT), 2017, pp. 1-8 , doi: 10.1109/ICCCNT.2017.8204039. (Year: 2017).*

Lu Chi, et al., Deep Steering: Learning End-to-End Driving Model from Spatial and Temporal Visual Cues, arxiv .org, Cornell University Library, 201 Olin Library Cornell University Ithaca, NY 14853, Aug. 12, 2017 (12 pages).

Partial European Search Report dated Jun. 24, 2020 in related European Patent Application No. 19216460.6 (14 pages).

John Vijay et al.: Estimation of Steering Angle and Collision Avoidance for Automated Driving Using Deep Mixture of Experts, IEEE Transactions on Intelligent Vehicles, IEEE, vol. 3, No. 4, Dec. 1, 2018, pp. 571-584 (14 pages).

Extended Search Report dated Nov. 2, 2020 in related European Patent Application No. 19216460.6 (14 pages).

Jianqun Wang et al.; "*The Characteristic recognition model for real-time driving behavior*", 2095-2783 (2017) 19-2166-06; School of Mechanical Engineering, Beijing Institute of Technology, Beijing 100086 China; Beijing North Vehicle Group Corporation, Beijing 100072 China; China SciencePaper, vol. 12, No. 19, Oct. 2017; (6 pages) (English Abstract).

* cited by examiner

DEEP LEARNING MODEL USED FOR DRIVING BEHAVIOR RECOGNITION AND TRAINING APPARATUS AND METHOD THEREOF

CROSS-REFERENCE TO RELATED APPLICATION

This application is based on and hereby claims priority under 35 USC 119 to Chinese Patent Application No. 201910073206.X, filed Jan. 25, 2019, in the China National Intellectual Property Administration, the entire contents of which are incorporated herein by reference.

TECHNICAL FIELD

This disclosure relates to the field of information technologies, and in particular to a deep learning model used for driving behavior recognition and training apparatus and method thereof.

BACKGROUND

In recent years, with the help of deep learning, researches in the field of computer vision have made great progress. The deep learning refers to a set of algorithms that use various machine learning algorithms to solve various problems such as images and texts on a hierarchical neural network. The core of the deep learning is feature learning, which aims to obtain hierarchical feature information through hierarchical neural networks, thereby solving important problems that require designing features manually. The deep learning is gradually applied in various fields of artificial intelligence.

Driving behavior recognition is an important part of smart driving. A traditional driving behavior recognition model analyzes driving parameters of the vehicle to obtain recognition results.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, the driving parameters of the vehicle are usually not open to the public, so it is difficult to obtain the driving parameters of the vehicle for training a model. Therefore, it is difficult to ensure a recognition accuracy of the recognition model based on the driving parameters.

Embodiments of this disclosure provide a deep learning model used for driving behavior recognition and training apparatus and method thereof. In recognition, the model performs feature extraction by using a plurality of consecutive input images obtained by capturing from a driving angle of view of a vehicle, and performs temporal and spatial fusion on extracted features by using a recursive neural network; furthermore, in training, as images obtained by capturing from a driving angle of view of a vehicle are easy to be acquired, the model may be relatively easily trained. Hence, the model may accurately recognize various classes of driving behaviors.

According to a first aspect of the embodiments of this disclosure, there is provided a deep learning model used for driving behavior recognition, including: a convolutional neural network configured to extract features of a plurality of temporally consecutive input images, the input images being obtained by capturing from a driving angle of view of a vehicle; a recursive neural network configured to perform temporal and spatial fusion on the features extracted by the convolutional neural network; a first fully-connected layer configured to perform dimension reduction on an output result of the recursive neural network, and output a plurality of groups of class features corresponding to the plurality of input images; and a probability layer configured to determine and output probabilities of classes of driving behaviors of a user driving the vehicle according to the plurality of groups of class features outputted by the first fully-connected layer.

According to a second aspect of the embodiments of this disclosure, there is provided a training apparatus for the deep learning model as described in the first aspect of the embodiments of this disclosure, the apparatus including: a first training unit configured to train the convolutional neural network in the deep learning model; and a second training unit configured to train the whole deep learning model after the training of the convolutional neural network by the first training unit is finished, until losses of the deep learning model converge and a validation accuracy is greater than a predetermined threshold.

According to a third aspect of the embodiments of this disclosure, there is provided an electronic device, including the apparatus as described in the second aspect of the embodiments of this disclosure.

According to a fourth aspect of the embodiments of this disclosure, there is provided a training method for the deep learning model as described in the first aspect of the embodiments of this disclosure, the method including: training the convolutional neural network in the deep learning model; and training the whole deep learning model after the training of the convolutional neural network is finished, until losses of the deep learning model converge and a validation accuracy is greater than a predetermined threshold.

Advantages of the embodiments of this disclosure exist in that in recognition, the model performs feature extraction by using a plurality of consecutive input images obtained by capturing from a driving angle of view of a vehicle, and performs temporal and spatial fusion on extracted features by using a recursive neural network; furthermore, in training, as images obtained by capturing from a driving angle of view of a vehicle are easy to be acquired, the model may be relatively easily trained. Hence, the model may accurately recognize various classes of driving behaviors.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
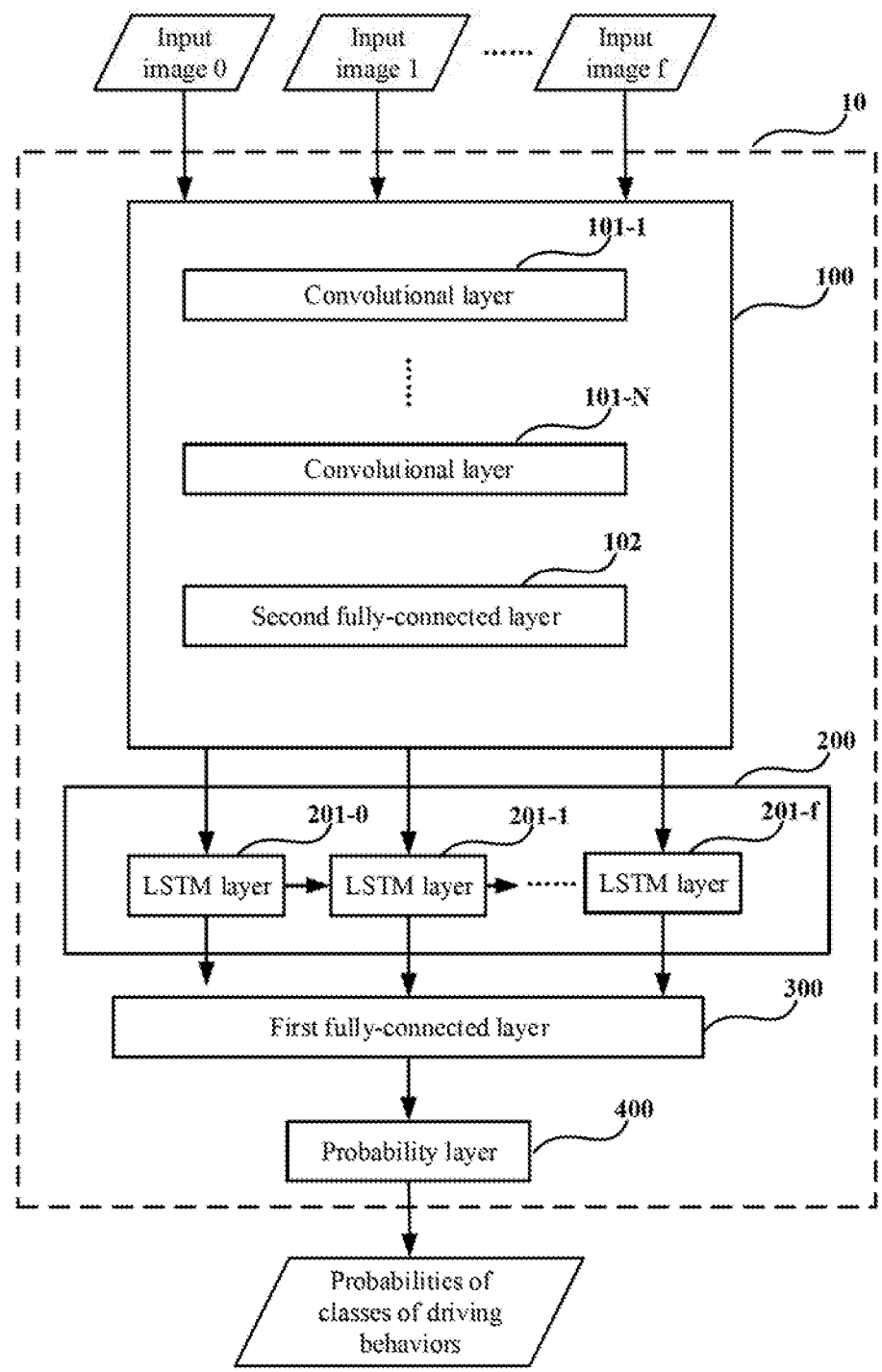
FIG. 1 is a schematic diagram of the deep learning model used for driving behavior recognition of Embodiment 1 of this disclosure.

This embodiment of this disclosure provides a deep learning model used for driving behavior recognition. FIG. 1 is a schematic diagram of the deep learning model used for driving behavior recognition of Embodiment 1 of this disclosure.

As shown in FIG. 1, a deep learning model 10 used for driving behavior recognition includes: a convolutional neural network 100 configured to extract features of a plurality of temporally consecutive input images, the input images being obtained by capturing from a driving angle of view of a vehicle; a recursive neural network 200 configured to perform temporal and spatial fusion on the features extracted by the convolutional neural network; a first fully-connected layer 300 configured to perform dimension reduction on an output result of the recursive neural network, and output a plurality of groups of class features corresponding to the plurality of input images; and a probability layer 400 configured to determine and output probabilities of classes of driving behaviors of a user driving the vehicle according to the plurality of groups of class features outputted by the first fully-connected layer.

It can be seen from the above embodiment that in recognition, the model performs feature extraction by using a plurality of consecutive input images obtained by capturing from a driving angle of view of a vehicle, and performs temporal and spatial fusion on extracted features by using a recursive neural network; furthermore, in training, as images obtained by capturing from a driving angle of view of a vehicle are easy to be acquired, the model may be relatively easily trained. Hence, the model may accurately recognize various classes of driving behaviors.

In this embodiment, the plurality of input images are a plurality of temporally consecutive images, such as a series of images having a predetermined time interval. And the plurality of input images are images taken from a driving angle of view of a vehicle.

In this embodiment, the plurality of input images are obtained by capturing via an imaging device in the vehicle.

For example, the plurality of input images are a frame sequence captured by a driving recorder in the vehicle.

In this embodiment, the number of the plurality of input images simultaneously inputted into the convolutional neural network 100 may be determined according to actual requirements. For example, the number of the input images simultaneously inputted into the convolutional neural network 100 is eight.

As shown in FIG. 1, the plurality of input images simultaneously inputted into the convolutional neural network 100 are f+1 input images numbered 0~f.

In this embodiment, the convolutional neural network 100 may use an existing network structure.

For example, the convolutional neural network 100 may be a convolutional neural network of the AlexNet type. And furthermore, the convolutional neural network 100 may also be a convolutional neural network of such types as GoogleNet, or VGG, or ResNet. In this embodiment, description is given by taking a convolutional neural network of AlexNet type as an example.

As shown in FIG. 1, the convolutional neural network 100 may include a plurality of convolutional layers 101-1~101-N and a second fully-connected layer 102.

In this embodiment, the plurality of convolution layers 101-1~101-N may use an existing structure, N being an integer greater than or equal to 2. And the number of the convolution layers may be set according to actual requirements. For example, the number of the convolutional layers is five.

As shown in FIG. 1, input images numbered 0~f are simultaneously inputted into the convolutional neural network 100, and the convolutional neural network 100 sequentially processes the input images numbered 0~f to obtain respective extracted features of the input images numbered 0~f, and the respective extracted features of the input images numbered 0~f are inputted to the recursive neural network 200, respectively.

In this embodiment, the recursive neural network 200 performs temporal and spatial fusion on the features extracted by the convolutional neural network 100.

For example, the recursive neural network 200 may include a plurality of long short-term memory (LSTM) layers corresponding to the plurality of input images.

In this embodiment, for a long short-term memory layer in the plurality of long short-term memory layers, features of an input image corresponding to the long short-term memory layer extracted by the convolutional neural network 100 and an output result of a previous long short-term memory layer of the long short-term memory layer are inputted into the long short-term memory layer.

For example, as shown in FIG. 1, the recursive neural network 200 includes f+1 LSTM layers 201-0~201-f numbered 0~f corresponding to the input images numbered 0~f. For an LSTM layer 201-0, what is inputted is a feature of an input image (i.e. the input image numbered 0) to which the LSTM layer corresponds extracted by the convolutional neural network 100, and for an LSTM layer 201-1, what is inputted is a feature of an input image (i.e. the input image numbered 1) to which the LSTM layer corresponds extracted by the convolutional neural network 100 and the output result of the LSTM layer 201-0, and so on. In this way, by combining the features of the corresponding input images and the output result of the previous LSTM layer, it is possible to achieve sufficient temporal and spatial fusion of the features of the plurality of input images.

In this embodiment, the first fully-connected layer 300 performs dimension reduction on the output result of the recursive neural network 200, and outputs a plurality of groups of class features corresponding to the plurality of input images. The first fully-connected layer 300 may use an existing structure.

As shown in FIG. 1, the recursive neural network 200 inputs its output results into the first fully-connected layer 300 through the LSTM layers respectively.

For example, the f+1 LSTM layers output 1×256 features, and the first fully-connected layer 300 performs dimension reduction on 1×256×(f+1) features outputted by the f+1 LSTM layers to obtain 1×m×(f+1) features.

In this embodiment, m denotes the number of classes of driving behaviors, which is greater than or equal to 2, and may be set according to actual requirements. For example, the driving behaviors include the following five classes: normal driving, lane change, right turn, left turn, and parking to wait.

That is, each of the plurality of groups of class features outputted by the first fully-connected layer 300 includes m classes of features, and a value of each class of features may be any value greater than or equal to zero.

In this embodiment, the probability layer 400 determines and outputs the probabilities of classes of driving behaviors of a user driving the vehicle according to the plurality of groups of class features outputted by the first fully-connected layer 300. The probability layer 400 may use an existing structure.

For example, the probability layer 400 is a softmax layer, and outputs probabilities of the classes of driving behaviors denoted by 0~1.

For example, results outputted by the probability layer 400 are: normal driving: 0.00, lane change: 0.00, right turn: 0.01, left turn: 0.99, and parking to wait: 0.00.

In this embodiment, when a probability of a certain class is greater than a threshold, it may be determined that a driving behavior belongs to this class. For example, when a probability of a certain class is greater than 0.9, it may be determined that a current driving behavior belongs to this class.

In this embodiment, the deep learning model 10 may implement its recognition function as a separate apparatus or device, or the deep learning model 10 may be included in a driving behavior recognition apparatus.

In this embodiment, after the current driving behavior is recognized, it may be used in a plurality of ways. For example, according to the recognized driving behavior, security reminder may be provided to the user, or the driving behavior of the user may be analyzed, etc.

It can be seen from the above embodiment that in recognition, the model performs feature extraction by using a plurality of consecutive input images obtained by capturing from a driving angle of view of a vehicle, and performs temporal and spatial fusion on extracted features by using a recursive neural network; furthermore, in training, as images obtained by capturing from a driving angle of view of a vehicle are easy to be acquired, the model may be relatively easily trained. Hence, the model may accurately recognize various classes of driving behaviors.

Embodiment 2

This embodiment of this disclosure provides a training apparatus for the deep learning model used for driving behavior recognition described in Embodiment 1. A structure of the deep learning model is as shown FIG. 1, and the deep learning model 10 includes the convolutional neural network 100, the recursive neural network 200, the first fully-connected layer 300, and the probability layer 400.

Figure 2:
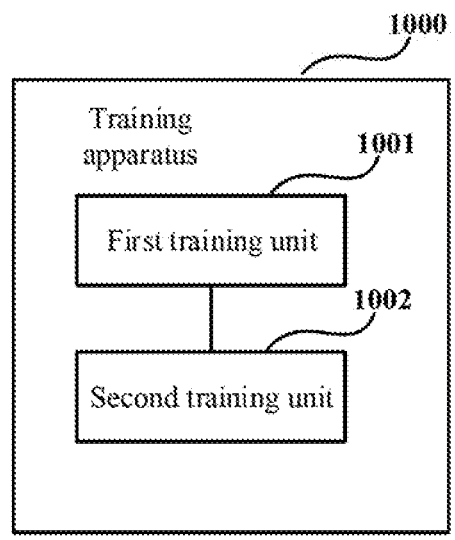
FIG. 2 is a schematic diagram of the training apparatus of Embodiment 2 of this disclosure.

FIG. 2 is a schematic diagram of the training apparatus of Embodiment 2 of this disclosure. As shown in FIG. 2, a training apparatus 1000 includes: a first training unit 1001 configured to train parameters of the convolutional neural network 100 in the deep learning model 10; and a second training unit 1002 configured to train the whole deep learning model 10 after the training of the convolutional neural network 100 by the first training unit 1001 is finished, until losses of the deep learning model 10 converge and a validation accuracy is greater than a predetermined threshold.

In this embodiment, the first training unit 1001 may train the convolutional neural network 100 by using an open dataset, such as training the convolutional neural network 100 by using a large amount images in the ImageNet.

In this embodiment, the first training unit 1001 may train the convolutional neural network 100 in the deep learning model 10 by using a related method.

After the training of the convolutional neural network 100 by the first training unit 1001 is finished, the second training unit 1002 trains the whole deep learning model 10, until losses of the deep learning model 10 converge and a validation accuracy is greater than a predetermined threshold.

In this embodiment, the second training unit 1002 may train the whole deep learning model by using images preobtained by capturing from a driving angle of view of a vehicle.

For example, training is performed by using images captured from a driving angle of view of a vehicle collected from a network and images recorded during driving by a user himself.

For example, a proportion of the training dataset, a verification data set and a test data set used by the second training unit 1002 is 6:2:2.

In this embodiment, the predetermined threshold may be set according to actual requirements; for example, the predetermined threshold is 95%.

It can be seen from the above embodiment that by stepwise training, an amount of samples used for training the convolutional neural network is very large, and samples used for training the whole model are easy to be obtained, hence, the deep learning model in Embodiment 1 may be easily obtained by training, and the recognition precision of the deep learning model may be ensured.

Embodiment 3

Figure 3:
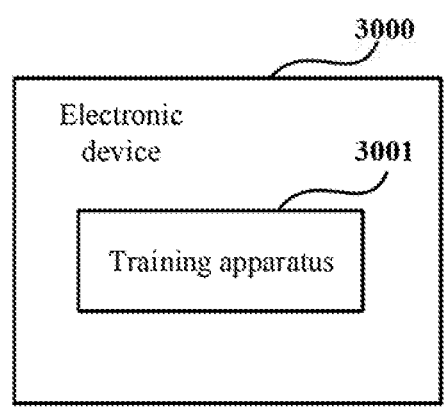
FIG. 3 is a schematic diagram of the electronic device of Embodiment 3 of this disclosure.

This embodiment of this disclosure provides an electronic device. FIG. 3 is a schematic diagram of the electronic device of Embodiment 3 of this disclosure. As shown in FIG. 3, an electronic device 3000 includes a training apparatus 3001, the training apparatus 3001 being used for training the deep learning model in Embodiment 1, and a structure and functions thereof being identical to those as described in Embodiment 2, which shall not be described herein any further.

Figure 4:
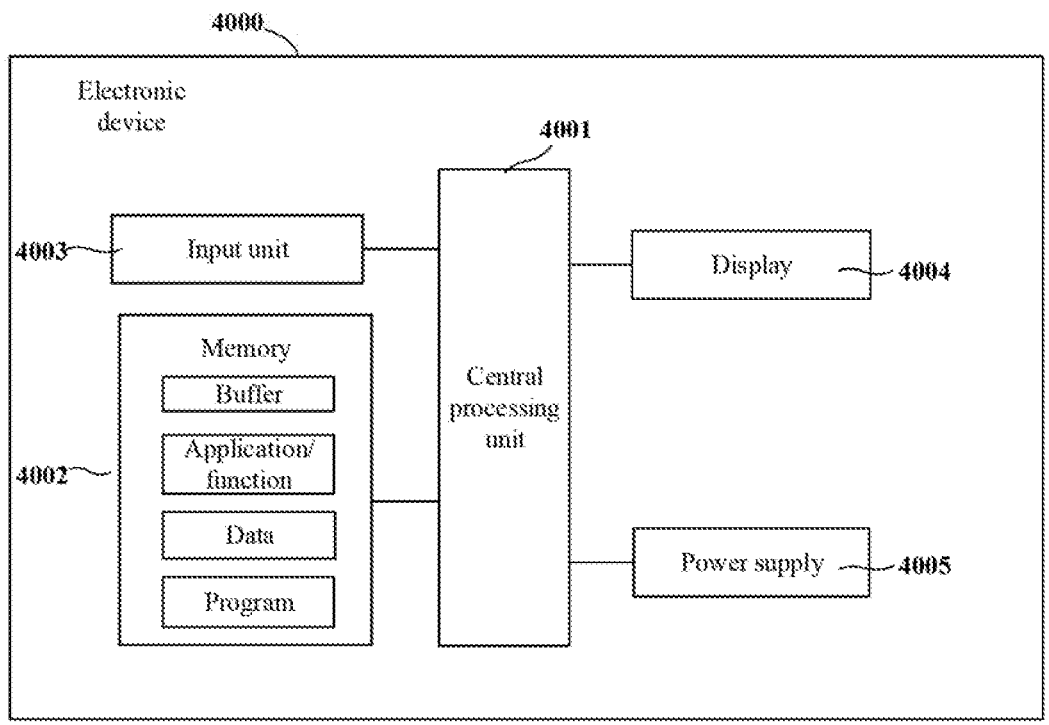
FIG. 4 is a block diagram of a systematic structure of the electronic device of Embodiment 3 of this disclosure.

FIG. 4 is a block diagram of a systematic structure of the electronic device of Embodiment 3 of this disclosure. As shown in FIG. 4, an electronic device 4000 may include a central processing unit 4001 and a memory 4002, the memory 4002 being coupled to the central processing unit 4001. This figure is illustrative only, and other types of structures may also be used, so as to supplement or replace this structure and achieve a telecommunications function or other functions.

As shown in FIG. 4, the electronic device 4000 may further include an input unit 4003, a display 4004 and a power supply 4005.

In one implementation, the functions of the training apparatus described in Embodiment 2 may be integrated into the central processing unit 4001. The central processing unit 4001 may be configured to: train the convolutional neural network in the deep learning model; and train the whole deep learning model after the training of the convolutional neural network by the first training unit is finished, until losses of the deep learning model converge and a validation accuracy is greater than a predetermined threshold.

For example, the training the convolutional neural network in the deep learning model includes: training the convolutional neural network by using an open dataset.

For example, the training the whole deep learning model includes: training the whole deep learning model by using images preobtained by capturing from a driving angle of view of a vehicle.

In another implementation, the training apparatus described in Embodiment 2 and the central processing unit 4001 may be configured separately. For example, the training apparatus may be configured as a chip connected to the central processing unit 4001, with its functions being realized under control of the central processing unit 4001.

In this embodiment, the electronic device 4000 does not necessarily include all the parts shown in FIG. 4.

As shown in FIG. 4, the central processing unit 4001 is sometimes referred to as a controller or control, which may include a microprocessor or other processor devices and/or logic devices, and the central processing unit 4001 receives input and controls operations of every component of the electronic device 4000.

The memory 4002 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 4001 may execute programs stored in the memory 4002, so as to realize information storage or processing, etc. Functions of other parts are similar to those of the relevant art, which shall not be described herein any further. The parts of the electronic device 4000 may be realized by specific hardware, firmware, software, or any combination thereof, without departing from the scope of this disclosure.

It can be seen from the above embodiment that by stepwise training, an amount of samples used for training the convolutional neural network is very large, and samples used for training the whole model are easy to be obtained, hence, the deep learning model in Embodiment 1 may be easily obtained by training, and the recognition precision of the deep learning model may be ensured.

Embodiment 4

Figure 5:
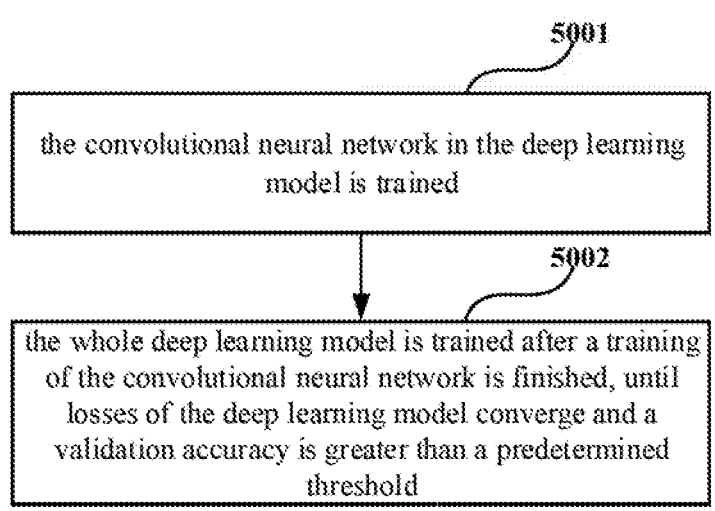
FIG. 5 is a flowchart of the training method of Embodiment 4 of this disclosure.

This embodiment of this disclosure provides a training method for the deep learning model used for driving behavior recognition described in Embodiment 1, the training method corresponding to the training apparatus in Embodiment 2. FIG. 5 is a flowchart of the training method of Embodiment 4 of this disclosure. As shown in FIG. 5, the method includes: Step 5001: the convolutional neural network in the deep learning model is trained; and Step 5002: the whole deep learning model is trained after a training of the convolutional neural network is finished, until losses of the deep learning model converge and a validation accuracy is greater than a predetermined threshold.

In this embodiment, implementations of the above steps are identical to those described in Embodiment 2, which shall not be described herein any further.

It can be seen from the above embodiment that by stepwise training, an amount of samples used for training the convolutional neural network is very large, and samples used for training the whole model are easy to be obtained, hence, the deep learning model in Embodiment 1 may be easily obtained by training, and the recognition precision of the deep learning model may be ensured.

This embodiment of this disclosure provides a driving behavior recognition apparatus, including the deep learning model described in Embodiment 1.

This embodiment of this disclosure provides a driving behavior recognition method, including: inputting a plurality of temporally consecutive input images into the deep learning model in Embodiment 1 to obtain probabilities of classes of driving behaviors of a user driving the vehicle outputted by the deep learning model.

An embodiment of the present disclosure provides a computer readable program, which, when executed in a training apparatus for the deep learning model or an electronic device, will cause a computer to carry out the training method for the deep learning model as described in Embodiment 4 in the training apparatus for the deep learning model or the electronic device.

An embodiment of the present disclosure provides a computer storage medium, including a computer readable program, which will cause a computer to carry out the training method for the deep learning model as described in Embodiment 4 in a training apparatus for the deep learning model or an electronic device.

The training method for the deep learning model carried out in the training apparatus for the deep learning model or the electronic device described with reference to the embodiments of this disclosure may be directly embodied as hardware, software modules executed by a processor, or a combination thereof. For example, one or more functional block diagrams and/or one or more combinations of the functional block diagrams shown in FIG. 2 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 2 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 2 may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An apparatus to implement a deep learning model used for driving behavior recognition, comprising:
 a processor to couple to a memory and to implement,
  a convolutional neural network (CNN) configured to extract features of a plurality of temporally consecutive input images captured from a driving angle of view of a vehicle;
  a recursive neural network (RNN) configured to perform temporal and spatial fusion on the features extracted by the CNN;
  a first fully-connected layer configured to perform dimension reduction on an output result of the RNN, and output a plurality of groups of class features corresponding to each input image of the plurality of input images; and
  a probability layer configured to determine and output probabilities of classes of driving behaviors of a user driving the vehicle according to the plurality of groups of class features corresponding to the input image,
 wherein,
  the RNN comprises a plurality of long short-term memory layers corresponding to the input image, and
  for a long short-term memory layer in the plurality of long short-term memory layers, features of the input image corresponding to the long short-term memory layer extracted by the CNN and an output result of a long short-term memory layer preceding the long short-term memory layer, are input into the long short-term memory layer.

2. The deep learning model according to claim 1, wherein, the CNN comprises a plurality of convolutional layers and a second fully-connected layer.

3. A training apparatus for the deep learning model as claimed in claim 1, comprising:
 a processor that couples to a memory and to,
  train the CNN in the deep learning model; and
  train the deep learning model after the training of the CNN is finished, until losses of the deep learning model converge and a validation accuracy is greater than a threshold.

4. The apparatus according to claim 3, wherein, the CNN is trained using an open dataset.

5. The apparatus according to claim 3, wherein, the deep learning model is trained using images previously captured from each driving angle of view of each vehicle of vehicles.

6. A training method for the deep learning model as claimed in claim 1, the method comprising:
 training the CNN in the deep learning model; and
 training the deep learning model after the training of the CNN is finished, until losses of the deep learning model converge and a validation accuracy is greater than a threshold.

7. The method according to claim 6, wherein the training the CNN is by using an open dataset.

8. The method according to claim 6, wherein the training the whole deep learning model is by using images previously captured from each driving angle of view of each vehicle of vehicles.

* * * * *